United States Patent [19]

Martin

[11] Patent Number: 4,659,893
[45] Date of Patent: Apr. 21, 1987

[54] METHOD AND APPARATUS FOR CONTROLLING THE GAP CONDITIONS IN TRAVELLING WIRE EDM BY ELECTROMAGNETIC FORCE

[75] Inventor: Roland Martin, Dingy-en-Vuach, France

[73] Assignee: Charmilles Technologies S.A., Geneve, Switzerland

[21] Appl. No.: 787,983

[22] Filed: Oct. 16, 1985

[30] Foreign Application Priority Data

Oct. 16, 1984 [CH] Switzerland ............... 4954/84

[51] Int. Cl.[4] .................. B23H 1/02; B23H 7/02; B23H 7/32
[52] U.S. Cl. .................. 219/69 M; 219/69 G; 219/69 W
[58] Field of Search ............ 219/69 M, 69 V, 69 W, 219/69 R, 69 G; 204/129.25, 129.5, 224 M

[56] References Cited

U.S. PATENT DOCUMENTS

| 4,205,212 | 5/1980 | Ullmann et al. | 219/69 W |
| 4,329,558 | 5/1982 | Martin | 219/69 M |
| 4,366,358 | 12/1982 | Inoue | 219/69 M |
| 4,379,960 | 4/1983 | Inoue | 219/69 M |
| 4,459,455 | 7/1984 | Inoue | 219/69 M |
| 4,559,432 | 12/1985 | Itoh | 219/69 C |

FOREIGN PATENT DOCUMENTS

| 1388930 | 1/1965 | France | 219/69 M |
| 164425 | 2/1980 | Japan | 219/69 W |
| 119323 | 9/1981 | Japan | 219/69 W |
| 58-94918 | 6/1983 | Japan | 219/69 M |
| 1299270 | 12/1972 | United Kingdom | 219/69 M |

Primary Examiner—A. D. Pellinen
Assistant Examiner—Geoffrey S. Evans
Attorney, Agent, or Firm—Hauke and Patalidis

[57] ABSTRACT

An arrangement for applying an electromagnetic force on the electrode wire of a travelling wire EDM apparatus by passing through the workpiece an auxiliary current parallel to the current flowing through the electrode wire, in one direction or the other. The points of application of the auxiliary current on the surface of the workpiece are disposed opposite to the front of a cut relative to the electrode wire in order to obtain a resultant force which either pulls the electrode wire away from the front of the cut or draws it closer to the front of the cut.

18 Claims, 2 Drawing Figures

METHOD AND APPARATUS FOR CONTROLLING THE GAP CONDITIONS IN TRAVELLING WIRE EDM BY ELECTROMAGNETIC FORCE

BACKGROUND OF THE INVENTION

The present invention relates to a method for controlling the machining conditions between an electrode workpiece and an electrode wire stretched between two electrode wire guide members in a travelling wire EDM apparatus.

In travelling wire EDM apparatus, the relative motions of the electrode wire guide members and the workpiece which are effected such as to provide a cut in the workpiece along a predetermined path are usually controlled by a numerical control unit. At the present state of the art, the speed at which those relative movements are effected is controlled such as to maintain predetermined conditions of electrical discharges in the machining zone between the electrode wire and the electrode workpiece.

A conventional approach for avoiding deterioration of the machining, or electro-erosive electrical discharges, for example due to short circuits, consists in withdrawing rapidly the electrodes one from the other. Such a rapid withdrawal motion can be effected very quickly in cavity sinking operations in view of the rigid connection between the electrode tool and its corresponding servo mechanism and/or between the electrode workpiece and its corresponding servo mechanism. By contrast, such a rigid connection is not present in operations wherein the electrode workpiece is cut by a travelling electrode wire. This is due to the relative flexibility of the electrode wire between its guide members and to the forces exerted transversely on the electrode wire during machining. In effect, the position of the longitudinal axis of the wire relative to the axis of alignment of the wire guide members is dependent upon an equilibrium between the forces of repulsion due to the electrical discharges and the electromagnetic and electrostatic forces due respectively to the machining current and to the voltage, further complicated by the force exerted on the wire due to the traction applied to the wire by the wire guide members.

When a short circuit occurs, the machining electrical discharges are suppressed and the forces of repulsion disappear. The forces of attraction continue to be applied to the wire, which causes the wire to be attracted against the surface of the workpiece, thus tending to increase the short circuits and creating an undesirable unstable condition.

Swiss Pat. No. 476,544 discloses a structure for withdrawing the electrode wire by reversing the direction of displacement of the wire guide members as soon as a short circuit is detected. However, in order to effectively pull the electrode wire away from the workpiece it is necessary that the reverse displacement of the guide members be sufficient to create a pulling force higher than the forces of attraction. Consequently, the withdrawal of the wire is effected only after a substantial period of time has elapsed, which prevents an effective withdrawal of the wire through the motion of its guide members to be effected in an efficient manner, and thus prevents a rapid improvement of the machining conditions.

U.S. Pat. No. 4,104,502 proposes to improve the alignment of the wire between its guide members by increasing the force of attraction exerted on the wire by passing an auxiliary current through the wire in addition to the current required for machining the workpiece by electrical discharges. However, the auxiliary current acts electromagnetically upon the wire in a single direction, without allowing reversal of the direction of the force exerted on the wire because that force is created by an inducted magnetic field whose direction is reversed simultaneously with the direction of flow of the auxiliary current. A decrease in the intensity of the magnetic field by decreasing the auxiliary current causes a withdrawal of the wire away from the closed end of the cut in the workpiece, or machining front, only if some force of repulsion, due to the effect of machining electrical discharges, is still present. In addition, in the event of full short-circuits, it is no longer possible to pull the wire from the workpiece without moving the wire guide members which, as previously indicated, is a slow operation.

SUMMARY OF THE INVENTION

The present invention has for a principal object elimination of the inconveniences of the prior art, and more particularly any lost time in withdrawing an electrode wire from the workpiece, by means of a method and an apparatus which permit an ultra-fast withdrawal of the wire in the event of a short circuit, such withdrawal being effected independently of the motion of the wire guide members.

The present invention permits selection of the direction of the induced magnetic field relative to the direction of machining current flow through the wire such as to exert on the wire either a force of repulsion, when a short circuit occurs, or a force of attraction if the wire is too far away from the workpiece. Thus, corrective measures are obtained by an electro-magnetic action, consequently very rapidly, prior to any motion of the wire guide members, with the assurance that optimum machining conditions are obtained.

The present invention will be best understood by those skilled in the art when the following description of the best mode contemplated at the present for practicing the invention is read with the accompanying drawing wherein:

DETAILED DESCRIPTION OF THE PREFERRED EMBODIMENT

Figure 1:
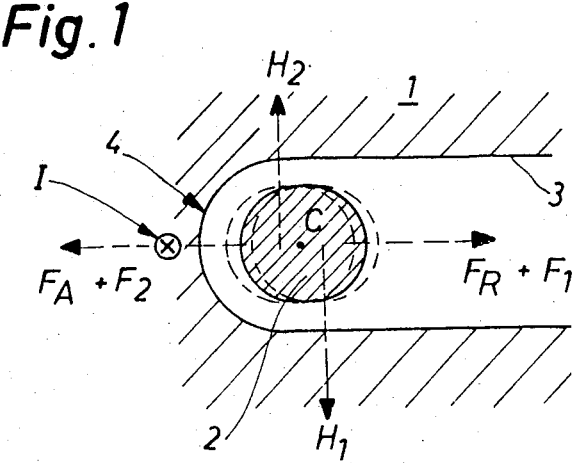
FIG. 1 is a schematic sectional view through the machining zone of a workpiece, taken in a plane perpendicular to the axis of the electrode wire.

Referring to the drawing FIG. 1 illustrates, schematically, the force acting on an electrode wire 2 effecting a cut in a workpiece 1. The centerline of the electrode wire 2 is shown at C, while reference numeral 3 designates the sidewall of the slot or kerf cut in the workpiece 1. The wire 2 is subjected during machining of the workpiece to forces of repulsion $F_R$ relative to the front 4 of machining of the cut in the workpiece 1, due essentially to the machining electrical discharges and to the gases produced by the electrical discharges. In addition, the electrode wire 2 is subjected to a force of attraction $F_A$, which is the resultant of electrostatic forces due to the machining current voltage, electromagnetic forces due to the machining current, and mechanical forces due to the pulling force resulting from the traction exerted on the wire 2. If it is assumed that the current flowing through the wire 2 is directed from top to bottom, at a right angle to the plane of the drawing, a magnetic field in the direction $H_1$ caused by an auxiliary current I flowing from top to bottom through the workpiece 3, proximate to the front 4 of machining of the cut, exerts on the wire 2 a force $F_1$ tending to pull the wire 2 away from the front 4 of machining. Conversely, a magnetic field $H_2$ of opposite direction, due to another auxiliary current $-I$, not shown, directed from bottom to top through the workpiece 1, exerts on the wire 2 a force $F_2$ tending to pull it towards the front 4 of the machining. It is thus seen that by simply controlling the direction and the intensity of the current flowing through the wire, which, in the example of preferred embodiment hereinafter described consists solely of the machining current flowing in a single direction in the wire, together with the direction and intensity of a current I flowing through the workpiece proximate the front of the cut, the balance of the forces applied on the wire can be adjusted such as to pull the wire towards the front of the cut or push the wire away from the front of the cut.

Figure 2:
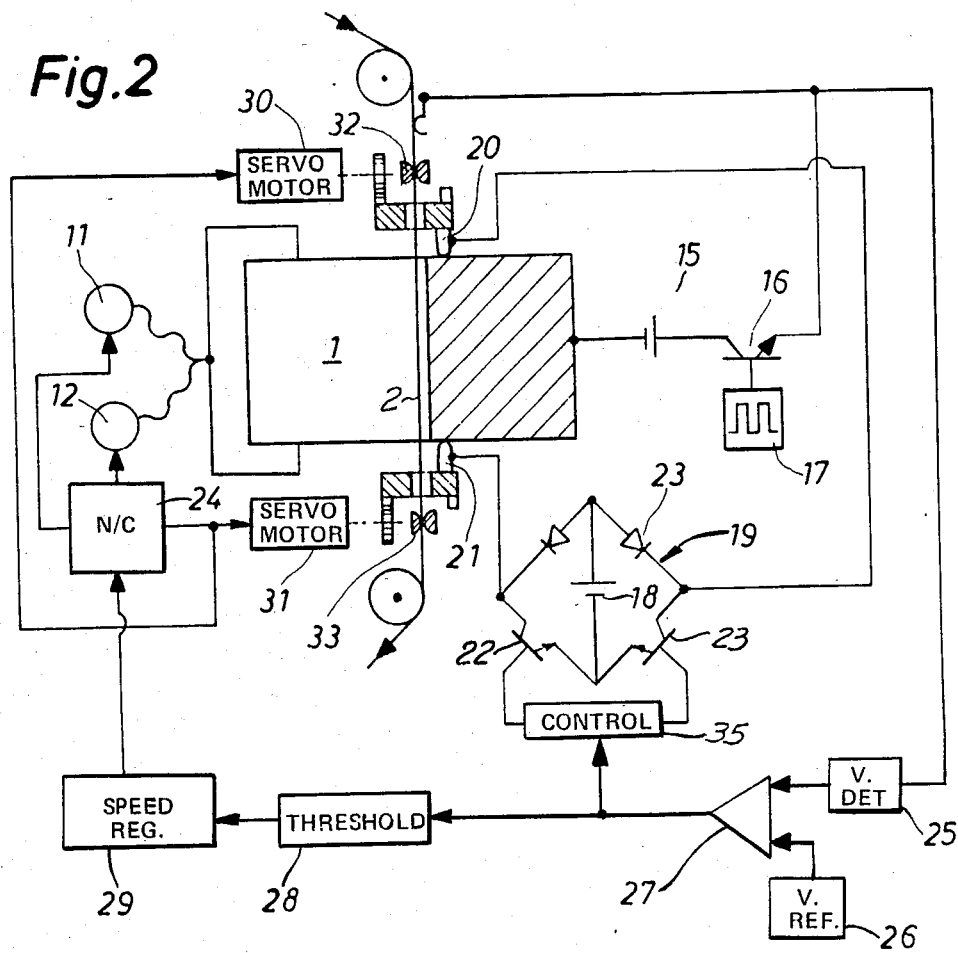
FIG. 2 is a schematic of a structure for practicing the method of the invention.

FIG. 2 illustrates an example of a structure for practicing the method of the invention by controlling the relative displacements between the wire 2 and the workpiece 1.

In the structure of FIG. 2, the machining pulses are provided by a conventional power supply comprising a source of DC current 15 and a transistor switch 16 controlled by a pulse generator or oscillator 17. The workpiece is displaced along the cutting path by cross-slide tables driven by two servo motors 11 and 12 controlled by a numerical control unit 24. A transverse magnetic field is produced by a current flowing through the workpiece in a direction parallel to the longitudinal axis of the wire 2 in the machining zone between the wire 2 and the workpiece 1. The auxiliary current is supplied by an independent circuit comprising a DC power supply 18 connected in a Wheatstone bridge 19 connected across the surfaces of the workpiece 1 by means of rotary contacts 20 and 21 disposed proximate the machining zone. The direction of current flow is controlled by a pair of transistors 22 and 23 connected in the branches of the Wheatstone bridge. The rotary contacts 20 and 21 are capable of being oriented around an axis corresponding to an imaginary straight line joining a pair of wire guide members 32 and 33. The orientation of the rotary contacts 20 and 21 around their axis of orientation is controlled by a numerical control unit 24 via two servo motors 30 and 31 such that the current flow through the workpiece 1 induces a magnetic field perpendicular to the direction of cut or more exactly perpendicular to the longitudinal axis of the wire in the machining zone.

The speed of relative displacement of the workpiece 1 and of the wire guide members 32 and 33 is controlled by a circuit in turn under the control of the machining conditions, for example the difference between the average machining voltage detected by a detector circuit 25 and a reference voltage provided by a voltage reference circuit 26. The two voltages are compared in a comparator 27 providing at its output signals applied to an input of the numerical control unit 24. However, the signals appearing at the output of the comparator 27 act upon the numerical control unit 24 only after passing through an adjusting or limiting circuit 28 which produces an output only above a predetermined absolute value of the difference between the two voltages. Below that threshold, the speed of relative displacements is maintained constant by a circuit 29 and a rapid correction of the position of the wire is effected by modifying the transverse magnetic field, Preferably, the reference value of the magnetic field which corresponds to a zero difference, and consequently to no correction, is determined by a control circuit 35, which normally controls the direction of the auxiliary current by controlling the switching of the transistors 22 and 23, such as to obtain an alignment of the wire with its guide members. In this manner, it is not required to reverse the magnetic field in order to reverse the direction of correction, and it becomes possible to pull the wire away from the front of cut simply by decreasing the intensity of the magnetic field below the magnetic field reference value.

However, a field intensity of zero may also be chosen as the reference value of the magnetic field and the action of the reference value, with an appropriate sign, is controlled such that a correcting factor is provided only for correcting electrical discharge abnormalities. Such an arrangement is particularly advantageous in the course of a finishing pass over a workpiece surface previously cut, as the alignment of the wire with its guide members can be achieved without the influence of an auxiliary magnetic field.

The machining speed, under normal conditions of electrical discharges, which is adjusted by the circuit 29 to a value proportional to the height of the workpiece, to the voltaic cell formed by the electrodes and to the characteristics of the pulse generator such as to maintain the machining current density at a constant level, is very important for obtaining an optimum machining efficiency.

It is also possible to slave continuously the machine feed speed to the electrical discharge conditions by decreasing the width of the threshold of the circuit 28 to zero and to permit a correction through the action of the transverse magnetic field only in the event of machining abnormalities, which ensures an extremely rapid correction upon the occurrence of such abnormalities, such as, for example, short circuits, and which effectively increases machining efficiency.

Having thus described the present invention, modifications whereof will be readily apparent to those skilled in the art, what is claimed as new is as follow:

1. In a method for cutting by machining electrical discharges an electrode workpiece by means of an electrode wire stretched and longitudinally displaced between guide members, wherein the relative speed of displacement of the electrode workpiece and of the wire guide members is controlled as a function of the conditions of electrical discharges, the improvement for controlling said conditions of electrical discharges comprising producing in a machining zone between said electrode wire and said electrode workpiece an auxiliary magnetic field substantially perpendicular to the electrode wire by passing through the electrode workpiece and proximate the machining zone an electrical current in a direction substantially parallel to said electrode wire, and varying said electrical current as a function of machining conditions such as to pull the electrode wire away from the electrode workpiece in the event of short circuit and to push the electrode wire towards the electrode workpiece in the event of a decrease in electrical discharge energy.

2. The method of claim 1 wherein the speed of relative displacements of the electrode workpiece and of the electrode wire guide members is maintained at a predetermined value as long as the variations of machining conditions remain within a predetermined range and said speed is varied when said variations are outside of said range.

3. The method of claim 1 wherein said varying of said electrical current comprises reversing the direction of flow of said electrical current.

4. The method of claim 1 wherein the intensity of said elecrical current is varied as a function of predetermined machining parameters.

5. The method of claim 3 wherein the intensity of said electrical current is varied as a function of predetermined machining parameters.

6. The method of claim 5 wherein the speed of relative displacements of the electrode workpiece and of the electrode wire guide members is maintained at a predetermined value as long as the variations of machining conditions remain within a predetermined range and said speed is varied when said variations are outside of said range.

7. The method of claim 3 wherein the speed of relative displacements of the electrode workpiece and of the electrode wire guide members is maintained at a predetermined value as long as the variations of machining conditions remain within a predetermined range and said speed is varied when said variations are outside of said range.

8. The method of claim 4 wherein the speed of relative displacements of the electrode workpiece and of the electrode wire guide members is maintained at a predetermined value as long as the variations of machining conditions remain within a predetermined range and said speed is varied when said variations are outside of said range.

9. In an apparatus for cutting by machining electrical discharges an electrode workpiece by means of an electrode wire stretched and longitudinally displaced between a pair of guide members, wherein the relative speed of displacement of the electrode workpiece and of the electrode wire guide members is controlled as a function of the conditions of electrical discharges, the improvement comprising means for producing in a machining zone between the electrode wire and a machining front in the electrode workpiece an auxiliary magnetic field substantially perpendicular to the electrode wire, said means for producing comprising means for supplying an electrical current passing through the electrode workpiece proximate the machining zone, said electrical current being substantially parallel to said electrode wire, and adjusting means for varying said electrical current in response to the difference between a value representing the conditions of electrical discharges and a reference value.

10. The improvement of claim 9 further comprising second adjusting means for maintaining the speed of relative displacement of the workpiece and of the electrode wire guide members at a predetermined value as long as the variations of machining conditions remain within a predetermined range, and wherein said speed is changed when said variations are outside of said range.

11. The improvement of claim 10 wherein said means for supplying said electrical current to the electrode workpiece comprises electrical contacts orientable around an axis substantially parallel to the electrode wire, said electrical contacts being arranged to engage said electrode workpiece on opposite surfaces proximate the machining zone, and a control circuit for orienting said electrical contacts so as to position said contacts substantially opposite the machining front relative to the electrode wire.

12. The improvement of claim 11 wherein said means supplying for said electrical current to the electrode workpiece comprises a Wheatstone bridge having a first diagonal across said electrical contacts and a DC power supply connected across a second diagonal, said bridge having branches in which are connected said adjusting means.

13. The improvement of claim 10 wherein said means supplying for said electrical current to the electrode workpiece comprises a Wheatstone bridge having a first diagonal connected across opposite surfaces of said electrode workpiece proximate said machining zone and a DC power supply connected across a second diagonal, said bridge having branches in which are connected said first mentioned adjusting means.

14. The improvement of claim 9 wherein said means for supplying said electrical current to the electrode workpiece comprises electrical contacts orientable around an axis substantially parallel to the electrode wire, said electrical contacts being arranged to engage said electrode workpiece on opposite surfaces proximate the machining zone, and a control circuit for orienting said electrical contacts so as to position said contacts substantially opposite the machining front relative to the electrode wire.

15. The improvement of claim 14 wherein said means supplying for said electrical current to the electrode workpiece comprises a Wheatstone bridge having a first diagonal connected across said electrical contacts and a DC power supply connected across a second diagonal, said bridge having branches in which are connected said adjusting means.

16. The improvement of claim 9 wherein said adjusting means comprises means for reversing the direction of flow of said electrical current.

17. The improvement of claim 16 wherein said means supplying for said electrical current to the electrode workpiece comprises a Wheatstone bridge having a first diagonal connected across opposite surfaces of said electrode workpiece proximate said machining zone and a DC power supply connected across a second diagonal, said bridge having branches in which are connected said adjusting means.

18. The improvement of claim 9 wherein said means supplying for said electrical current to the electrode workpiece comprises a Wheatstone bridge having a first diagonal connected across opposite surfaces of said electrode workpiece proximate said machining zone and a DC power supply connected across a second diagonal, said bridge having branches in which are connected said adjusting means.

* * * * *